United States Patent
Markelov

[19]

[11] Patent Number: 6,107,697

[45] Date of Patent: Aug. 22, 2000

[54] METHOD AND APPARATUS FOR PROVIDING DC CURRENT AND VOLTAGE FROM DISCRETE ENERGY ELEMENTS

[75] Inventor: Anatoli Nickolayevich Markelov, Panama, Panama

[73] Assignee: RHM High Tech, Inc., Panama City, Panama

[21] Appl. No.: 09/031,013

[22] Filed: Feb. 26, 1998

[51] Int. Cl.[7] ........................................................ H02J 7/00
[52] U.S. Cl. .................................. 307/43; 307/71; 307/77
[58] Field of Search ................................ 307/43, 71, 77; 320/15–18

[56] References Cited

U.S. PATENT DOCUMENTS

| | | |
|---|---|---|
| 3,387,194 | 6/1968 | Banks ........................................ 320/116 |
| 3,656,039 | 4/1972 | Konrad . |
| 3,694,721 | 9/1972 | Winebrener . |
| 3,697,839 | 10/1972 | Unnewehr . |
| 3,828,235 | 8/1974 | Price et al. . |
| 3,843,912 | 10/1974 | Anderson . |
| 3,886,426 | 5/1975 | Daggett . |
| 3,890,548 | 6/1975 | Gray . |
| 3,947,743 | 3/1976 | Mabuchi et al. . |
| 4,097,788 | 6/1978 | Nygaard et al. . |
| 4,315,162 | 2/1982 | Ferguson ..................................... 307/66 |
| 4,689,531 | 8/1987 | Bacon . |
| 5,029,229 | 7/1991 | Nelson, III . |

*Primary Examiner*—Fritz Fleming
*Attorney, Agent, or Firm*—Greenberg Traurig, LLP; Authony R. Barkume

[57] ABSTRACT

A method for providing a voltage V which includes calculating a number R of energy elements required to provide a desired voltage V, assigning each of the total number of energy elements M a number from zero to M−1, selecting a number S from zero to M−1, connecting the energy elements in a set of groups of R energy elements in series starting with the first energy element assigned the number S, and connecting in parallel the set of groups of the R energy elements. The parallel connection of the set of groups is applied to the load as the desired voltage V and the steps are reiterated following termination of a predetermined assignment period. The method may further include connecting an additional set of energy elements not already connected in the groups in parallel, connecting a negativevemost terminal of the additional set of energy elements to the desired voltage V, and alternating at a predetermined rate between a positivemost terminal of the additional set and the desired voltage, thereby providing an intermediate voltage between the positivemost terminal and the desired voltage V.

28 Claims, 5 Drawing Sheets

METHOD AND APPARATUS FOR PROVIDING DC CURRENT AND VOLTAGE FROM DISCRETE ENERGY ELEMENTS

BACKGROUND OF THE INVENTION

This invention relates to direct current (DC) power sources and in particular to an apparatus and method for connecting a plurality of energy elements to achieve predetermined DC voltage steps and variations between those steps while ensuring uniform usage of energy elements.

The efficient operation of battery powered vehicles presents a number of unique problems. Firstly, it has been found that multiple discrete voltage steps are required by the DC motor in the vehicle during various phases of its operation. For instance, during the initial application of power to the DC motor, only a minimum voltage is required so as not to burn the motor. Thereafter, the voltage applied to the DC motor may be increased as the motor achieves its peak operating revolutions per minute (RPM).

The prior art has formulated different techniques to provide multiple discrete voltage steps to the DC motor. One such technique involves the use of a plurality of batteries connected in series in various numbers and configurations to achieve the desired voltage. For instance, assume that there are ten batteries in the power source, each having one volt in potential energy, and the DC motor requires two volts during the initial startup phase. By connecting two energy elements in series the desired voltage could readily be achieved. Additional energy elements are added to the two already connected as the DC motor proceeds to terminal RPM. However, this approach results in non-uniform discharge of the batteries since the batteries used in the startup phase are also used throughout the remaining phases of operation of the DC motor. This problem is compounded when the DC motor is subjected to numerous startup phases without attaining terminal RPM.

Non-uniform discharge of energy elements significantly diminishes the life of individual batteries or energy elements, particularly when dealing with batteries having a memory such as those manufactured based on nickel-cadmium technology. Non-uniform discharge also results in diminishing the duration of time that the vehicle can operate between recharges, since some of the energy elements (i.e., those not involved in the startup phase) will not be entirely discharged prior to the power source requiring a recharge.

Therefore, it would be advantageous if each of the energy elements were used in such a way that uniform discharge of each energy element was assured, thereby increasing the life of the individual energy elements and increasing the time between recharges.

Similarly, various voltage steps could be accomplished using a resistor ladder network. The network provides maximum resistance to one or more energy elements at startup resulting in minimum of voltage applied to the DC motor. Thereafter, the resistance is decreased yielding greater voltage to the DC motor. The disadvantage with this approach is the consequent loss of power in the form of heat dissipated by the resistors. Such a loss is particularly evident during startup, when the maximum number of resistors are used to reduce the voltage to its lowest value.

Therefore, it would be advantageous if energy were not lost during phases where the voltage applied to the DC motor must be reduced.

Another technique used to provide various voltage steps is achieved via modulation of the power to the DC motor. In this method the duration of the period in which voltage is applied to the DC motor is varied in order to achieve voltage steps. Several disadvantages result from this approach including heat loss in the DC motor and switching devices as well as degradation in the DC motor due to applying an essentially AC source of power to a motor designed for DC power.

Therefore, it would be advantageous if power was not significantly lost via heat in application to the DC motor while retaining the DC characteristics of the power regardless of the applied voltage.

SUMMARY OF THE INVENTION

In accordance with the present invention, a method for providing a voltage V is set forth which comprises calculating a number R of energy elements required to provide a desired voltage V, assigning each of the total number of energy elements M a number from zero to M−1, selecting a number S from zero to M−1, connecting the energy elements in a set of groups of R energy elements in series starting with the first energy element assigned the number S, and connecting in parallel the set of groups of the R energy elements, the parallel connection of groups providing a voltage substantially equivalent to the desired voltage V. The parallel connection of the set of groups is applied to the load as the desired voltage V and the steps of selecting the number S, connecting the energy elements in a set of groups of R energy elements in series, and connecting in parallel the set of groups of the R energy elements following termination of a predetermined assignment period is reiterated. The number S is substantially randomly selected or selected by incrementing a prior value of the number S by a predetermined amount.

In further accordance with the present invention, the method further comprises the steps of connecting an additional set of the energy elements not already connected in the groups in series, connecting a negativevemost terminal of the additional set of energy elements to the desired voltage V, and alternating at a predetermined rate between a positivemost terminal of the additional set and the desired voltage, thereby providing an intermediate voltage between the positivemost terminal and the desired voltage V.

In accordance with the present invention, an apparatus is set forth which provides a voltage V comprising means for conducting primary voltage, means for conducting return voltage, means for providing discrete voltages connectable in series with each other, and means for control adapted to control the connectability of the means for providing discrete voltages. The means for providing discrete voltages connectable to the means for conducting primary voltage and the means for conducting return voltage. The means for control connecting a set of groups comprising R means for providing discrete values in series starting with a first energy element of the means for providing discrete voltages, the control device connecting the set of groups in parallel to provide a desired voltage in parallel across the means for conducting primary voltage and the means for conducting return voltage. The first energy element may be rechosen following an assignment period. The first energy element is chosen substantially at random or by incrementing through subsequent energy elements using a predetermined value. The means for providing discrete voltages comprises energy elements comprising substantially equivalent voltages.

In further accordance with the present invention, the apparatus for providing a voltage V further comprises means for conducting secondary voltage connectible to the means for providing discrete voltages and means for switching between providing the means for conducting secondary voltage and the means for conducting primary voltage. The means for switching is controllable by the control device. The means for switching alternatively provides the secondary voltage and the primary voltage at a predetermined rate, thereby providing a predetermined voltage between and inclusive of the primary voltage and the secondary voltage.

DETAILED DESCRIPTION OF PREFERRED EMBODIMENT

Figure 1:
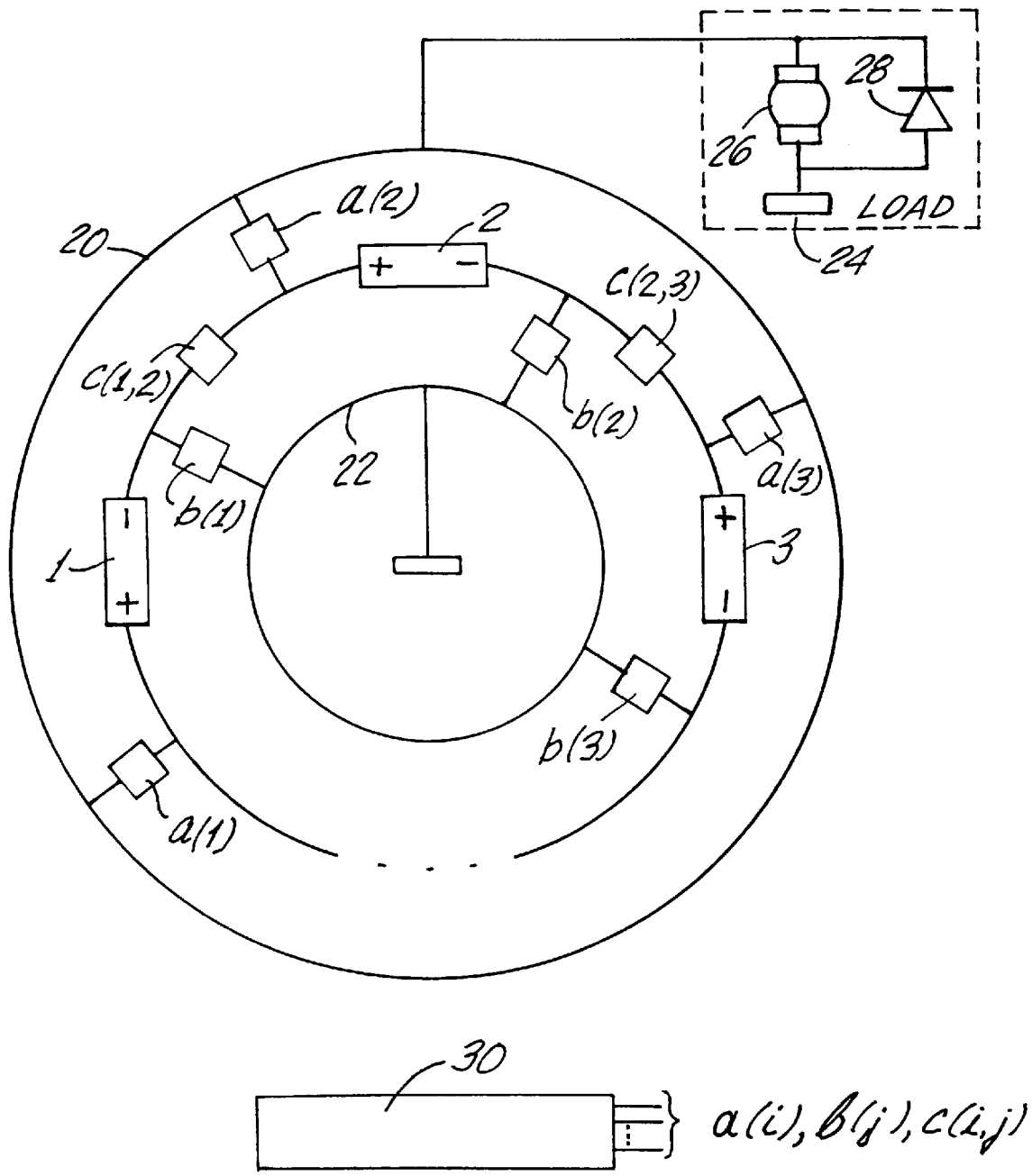
FIG. 1 illustrates a direct current (DC) voltage generator of the present invention connected to a load.

FIG. 1 illustrates a direct current (DC) voltage generator of the present invention, which comprises a plurality of batteries, photoelectric cells, secondary turns (with rectifiers) of a transformer, energy elements or sections 1 to 3, a control device 30, a plurality of primary positive switches a(1) to a(3) or a(i), a plurality of primary negative switches b(1) to b(3) or b(j), a plurality of series switches c(1,2) and c(2,3) or c(i,j), a primary positive bus 20, a ground or negative bus 22, and a load 24. The load 24 comprises a DC motor 26 with a load diode 28 connected in parallel with the DC motor 26. Although the load 24 comprises the DC motor 26 in the illustration, the load can comprise any device that uses DC power in order to operate.

Each battery section is assigned a corresponding primary positive switch, a corresponding primary negative switch and a corresponding series switch. The primary positive switches a(i) can connect the positive terminals of each section to the primary positive bus 20. The primary negative switches b(j) can connect the negative terminals of each section to the negative bus 22. The series switches c(i,j) permit the series connection of contiguous sections by connecting the negative terminal of one section to the positive terminal of a subsequent section.

The switches can be in an open state or a closed state. The control device 30 is capable of controlling these states in accordance with a method to be described via means well known in the art, such as through the use of digital control signals triggering entry into the various states. A set of control signals, as indicated by reference numerals a(i), b(j), and c(i,j), originate from the control device 30 and are connected to each of the switches (connection not shown) bearing the corresponding reference numeral. The control device could comprise a microcontroller, a microprocessor with additional peripheral devices such as memory, timers, etc. or other devices well known in the art capable of controlling the switches according to a specified algorithm. The control device could provide an address with a read or write strobe a programmable logic device, which would then provide address specific strobing or level control signals to the switches.

Figure 2:
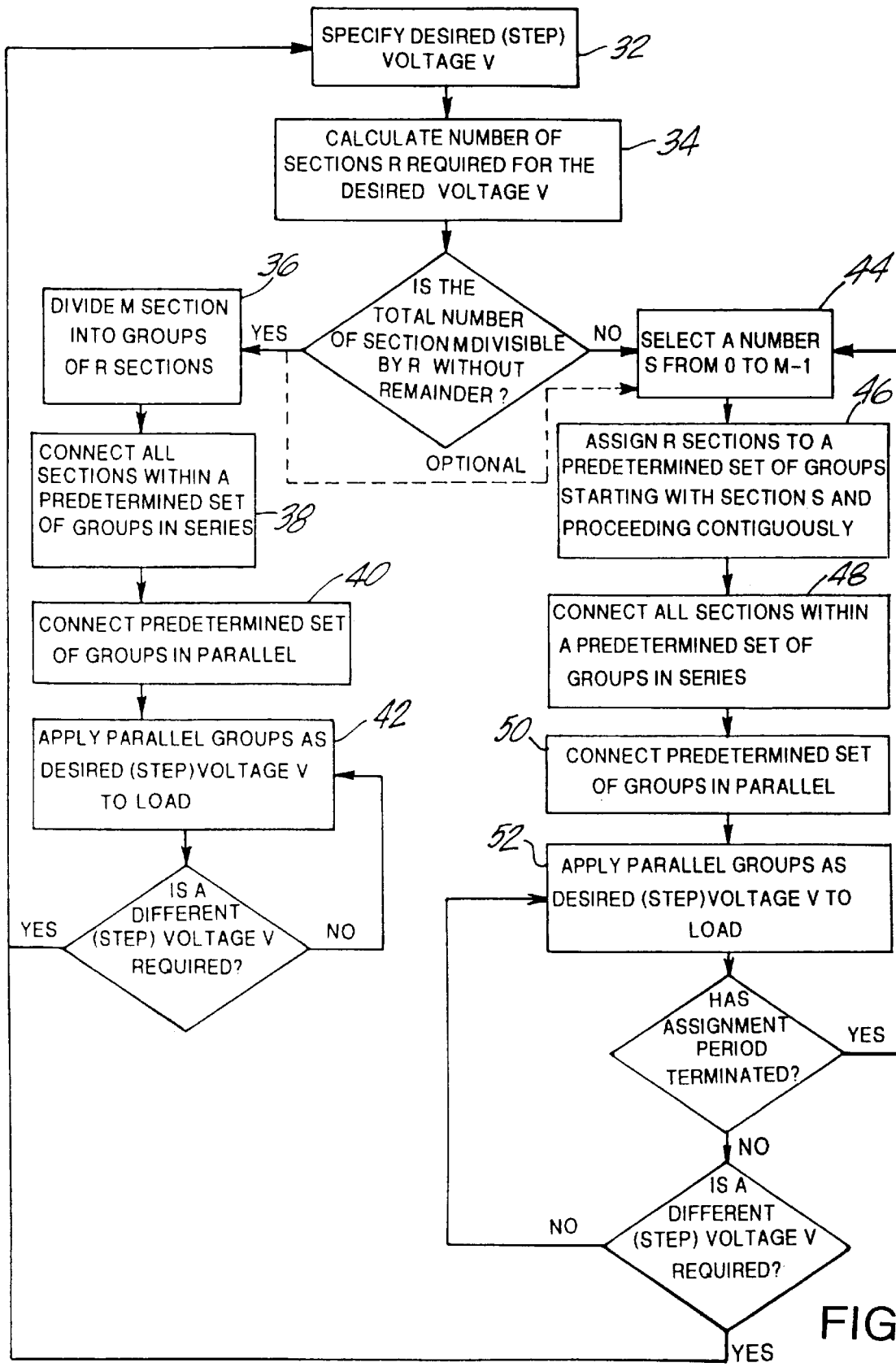
FIG. 2 is a flowchart illustrating the operation of DC current generator of FIG. 1.

FIG. 2 illustrates a method used in conjunction with the DC current generator of FIG. 1 in order to provide discrete voltage steps to the load 24. The method begins by specifying a desired step voltage V to be applied to the load in step 32. Then the number of energy elements R required in order to achieve the desired voltage V is calculated. Assuming that the voltage of each energy element U is substantially equivalent, the number of energy elements required to provide the desired voltage V can be obtained by the following equation in step 34:

$$R = \frac{V}{U}$$

If the total number of sections M in the DC current generator is divisible by R without a remainder then the total number of sections M are divided into a set of groups (which may or may not comprise of all M sections), each group comprising R sections in step 36. The sections in each group are then connected in series to provide the desired voltage V from each group in step 38. Each group is then connected in parallel across the load in step 40. In this way, uniform discharge of sections is assured since all sections will be used to substantially the same extent. The desired voltage V is then applied to the load, in step 42, as the parallel connection of each group of R sections connected in series. If a different voltage V is required (e.g., when ramping from an initial voltage to a final voltage) the entire process is reiterated starting with step 32.

Conversely, if the total number of sections M is not divisible by R without a remainder, then a number S is selected in step 44. The remainder of M divided by R represents the number of sections which will remain unassigned to a group and, therefore, unconnected in the first embodiment. The number S may be selected at random during each iteration of step 44 using the Law of Uniform Distribution. Alternatively, the number S may be arbitrarily assigned during the first iteration of step 44 and incremented or decremented by a predetermined value, such as one or two, during subsequent iterations of step 44. In the case of incrementing or decrementing the prior value of S to achieve the new value of S, the prior value must be stored and, therefore, memory is required. Since it is difficult to generate absolutely random numbers, it is to be understood that pseudo random numbers will suffice.

The Law of Uniform Distribution or Uniform Deviation provides that the relative frequency that any number in a set, such as (0, 1, 2, ..., n−1), will be chosen at random is equal to 1/n as the number of samples increases towards infinity.

The number S is then used to designate the number of a first section of a first group. Since the sections are assigned contiguously to contiguous groups, the choice of the first group determines which sections will remain unconnected and, therefore, which sections will not be discharged during a given iteration of steps 44 through 52. Since it is advisable that each section remains unassigned for substantially the same amount of time as any other section in order to promote uniform discharge of the sections, any method of choosing S to further this goal is sufficient.

The sections, starting with section S, are assigned into a predetermined set of groups of R sections, given the total number of sections M in step 46. Each section in each group are connected in series to yield the desired voltage V in step 48, and the predetermined set of groups are connected in parallel in step 50. The desired voltage V is applied to the load in step 52 as the parallel combination of the predetermined set of groups of R sections connected in series without benefit of those groups and/or sections remaining unconnected.

In order to promote uniform discharge of sections, the selection of sections assigned to the groups remain in a given assignment only for a predetermined assignment period. Following termination of the assignment period another iteration will begin with the choice of a different number S in step 44. By choosing the different number S, a different s set of sections will remain unassigned as steps 44 through 52 are reiterated. If a different voltage V is required by the load (e.g., when ramping to a final voltage) then the entire process is reiterated starting with step 32.

With respect to FIG. 1, assuming again that there are M total sections, then to form a group of R sections, in order to obtain the desired voltage V=R*U where U is the voltage of each section, the random or aleatory number S is generated using the Law of Uniform Distribution between 0 and M−1. Given S, the following sections are connected in series:

$$S, (S+1)(\mod M), (S+2)(\mod M), \ldots, (S+R-1)(\mod M)$$

by means of the following switches:

$$c(S,S+1), c(S+1,S+2), \ldots, c(S+R-2,S+R-1).$$

The series connection of sections involves connecting a negative pole or terminal of a section to a positive pole or terminal of a subsequent section. The positive terminal of the first section of the first group is connected to the primary positive bus 20 by the primary positive switch a(S), and the negative terminal of the last section of the first group is connected to the negative bus 22 by the negative switch b(S+R−1).

As a generally applicable rule, a Law of Commutation, which provides the identity of the switches to be closed in the first group given the values of M, S and R, is as follows: for R=1, $$a(S) \& b(S)$$

for R>1, $$a(S) \& ( \&_{i=0}^{R-2} c((S+i)(\mod M),$$
$$(S+i+1)(\mod M))) \& b((S+R-1)(\mod M))$$

The symbols "a", "b" and "c" appearing in the formulas above are the Boolean variables which represent the states of the primary positive, negative and series switches of FIG. 1, respectively. For instance, the primary positive switch a(1) in FIG. 1 corresponds to the Boolean variable a(1) in the equations directly above. Likewise, the negative switch b(2) in FIG. 1 corresponds to the Boolean variable b(2) in the equations directly above. Since each switch can be in one of two states (i.e., open or closed), each Boolean variable can have one of two values (i.e., true=one or false=zero). Hence, when the Boolean variable a(1) is equal to one, the corresponding primary positive switch a(1) is in the closed state, and when the Boolean variable a(1) is equal to zero, the corresponding primary positive switch a(1) is in the open state. The function "&" represents the logical "and" function. The function "x(mod M)" represents the value of the remainder following division of the integer x by the integer M. For instance, 0(mod 3)=0, 1(mod 3)=1, 2(mod 3)=2, 3(mod 3)=0, 5(mod 3)=2, 6(mod 3)=0 and so on. The number S represents the number of the first section chosen at random, and when used parenthetically with switch nomenclature refers to the switch corresponding to that particular section. The expression, $$\&_{i=0}^{k} a(i)$$

represents the logical product of the Boolean variables a(0), a(1), . . . , a(k), and the symbol "i" represents an indexing variable. Thus, the expression, $$\&_{i=0}^{3} a(i)$$

is equal to $$a(0) \& a(1) \& a(2) \& a(3).$$

Therefore, according to the Law of Commutation discussed above if $$R \leq \frac{M}{2}$$

Then $$N = \text{int}(M/R)$$

groups are formed and connected in parallel across the primary positive bus 20 and the negative bus 22. The function "int(x)" represents the operation that returns the integer portion of x.

Application of the concepts discussed above to the case where the total number of sections M is equal to twelve is provided in the following Table 1 and illustrated in FIG. 3:

TABLE 1

| TOTAL NUMBER OF GROUPS | SECTIONS PER GROUP (R) | DESIRED VOLTAGE (V) | AMOUNT OF UNASSIGNED SECTIONS |
|---|---|---|---|
| 12 | 1 | 1U | 0 |
| 6 | 2 | 2U | 0 |
| 4 | 3 | 3U | 0 |
| 3 | 4 | 4U | 0 |
| 2 | 5 | 5U | 2 |
| 2 | 6 | 6U | 0 |
| 1 | 7 | 7U | 5 |
| 1 | 8 | 8U | 4 |
| 1 | 9 | 9U | 3 |
| 1 | 10 | 10U | 2 |
| 1 | 11 | 11U | 1 |
| 1 | 12 | 12U | 0 |

As an example of the formation of different voltages using the DC current generator having a total of four sections (M=4), assume that the sections are assigned the numbers zero through 3. For the first voltage step R is equal to one and, since M divided by R results in a remainder of zero, the sections are divided into four (M/R=4) groups of one section per group. Similarly, R is equal to two for the second voltage step and, since M divided by R also results in a remainder of zero, the sections are divided into two (M/R=2) groups of two sections per group. Likewise, R is equal to four for the fourth voltage step, and since M divided by four results in a remainder of zero, the sections are combined into (M/R=1) one group of four sections.

However, R is equal to three for the third voltage step, and since M divide by three results in a remainder of one, the sections are combined into (int(M/R)=1) one section having 3 sections per group with one section remaining unassigned.

In order to determine which sections will be in the group and which will remain unassigned the aleatory number S is chosen as in step 44 of FIG. 2. Thus, the following Table 2 provides the assignment of sections given the value of the number S:

TABLE 2

| S | SECTIONS ASSIGNED TO GROUP AND CONNECTED IN SERIES | NUMBER OF UNASSIGNED SECTION |
|---|---|---|
| 0 | 0,1,2 | 3 |
| 1 | 1,2,3 | 0 |
| 2 | 2,3,0 | 1 |
| 3 | 3,0,1 | 2 |

For M=12, R=1 and S=2 the formula corresponding to the case where R=1 results in the following equation for the first group:

$$a(2) \& b(2).$$

Solving this equation indicates that both switches a(2) and b(2) are equal to one or closed. Thus, a group of one section (i.e., section 2) is formed and connected in parallel to the load.

In order to connect the remaining groups of R=1 sections in parallel the following switches would have to be closed: a(3), b(3), a(4), b(4), a(5), b(5), a(6), b(6), a(7), b(7), a(8), b(8), a(9), b(9), a(10), b(10), a(11), b(11).

For M=12, R=5 and S=3 the formula corresponding to the case where R>1 results in the following equation for the first group:

$$a(3) \& (\&_{i=0}^{3} c((3+i)(\bmod 12),(4+i)(\bmod 12))) \& b((7)(\bmod 12)).$$

Solving this equation indicates that switches a(3), c(3,4), c(4,5), c(5,6), c(6,7), and b(7) must be closed in order to form a group with sections 3, 4, 5, 6, and 7 connected in series. In order to connect the remaining group of sections in parallel switches a(8), c(8,9), c(9,10), c(10,11), c(11,0), and b(0) would have to be closed leaving sections 1 and 2 unassigned and not connected. Naturally, other sections occurring between the two groups could be left unconnected instead of sections 1 and 2. For instance, if a group comprising sections 3, 4, 5, 6, 7 and a group comprising sections 9, 10, 11, 0, 1 were connected in parallel then sections 8 and 2 would remain unconnected.

For M=12, R=7 and S=4 the formula corresponding to the case where R>1 results in the following equation for the first group:

$$a(4) \& ( \&_{i=0}^{5} c((4 + i)(\bmod 12),$$

$$(5 + i)(\bmod 12))) \& b((10)(\bmod 12)).$$

Solving this equation indicates that switches a(4), c(4,5), c(5,6), c(6,7), c(7,8), c(8,9), c(9,10) and b(10) must be closed in order to form a group with sections 4, 5, 6, 7, 8, 9 and 10 connected in series. No additional groups of R=7 sections can be formed which leaves sections 11, 0, 1, 2, and 3 unconnected.

For M=12, R=5 and S=10 the formula corresponding to the case where R>1 results in the following equation for the first group:

$$a(10) \& ( \&_{i=0}^{3} c((10 + i)(\bmod 12),$$

$$(11 + i)(\bmod 12))) \& b((14)(\bmod 12)).$$

Figure 3:
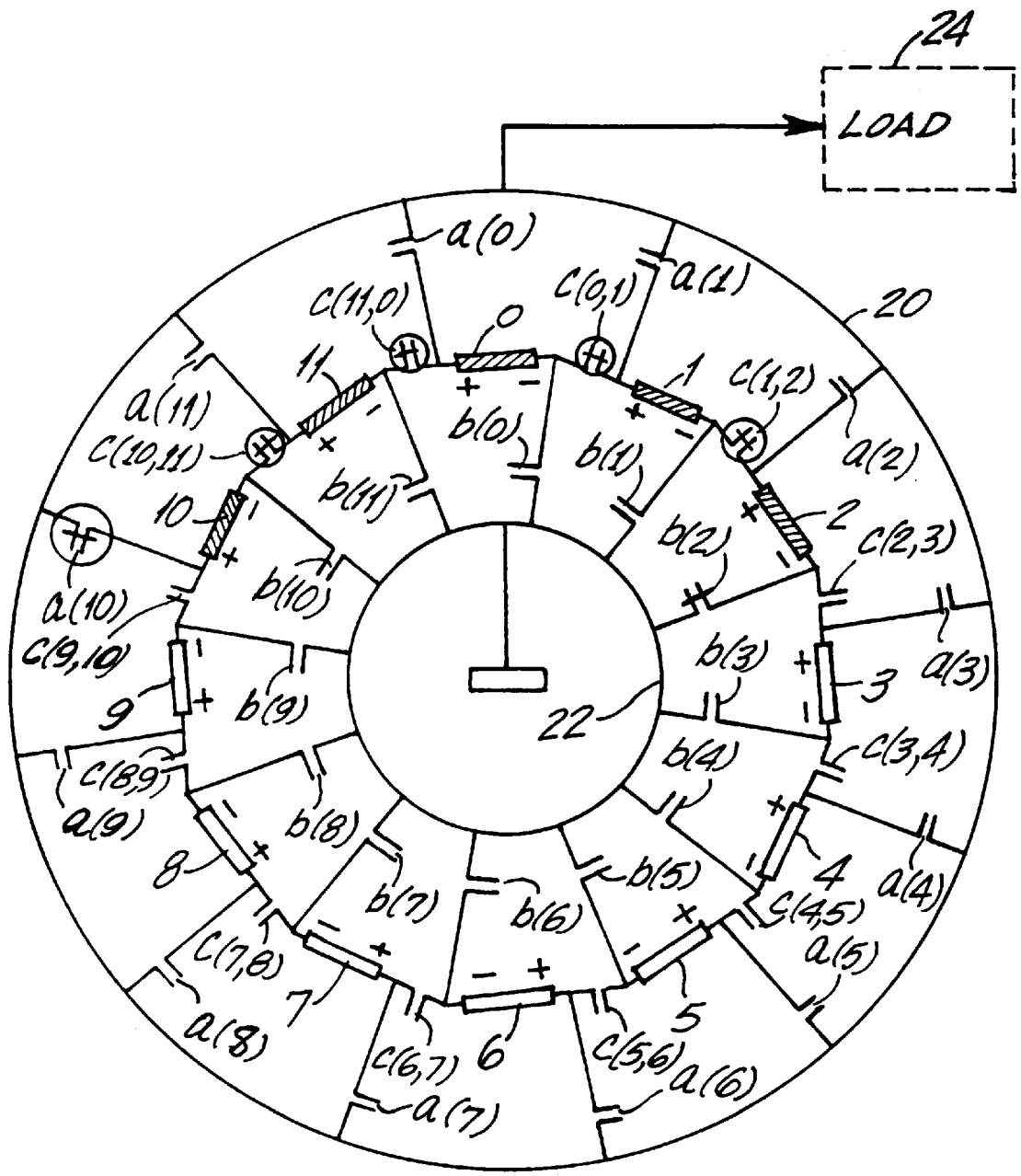
FIG. 3 illustrates the DC current generator and load of FIG. 1 comprising a specific number of sections and switches.

Solving this equation indicates that switches a(10), c(10,11), c(11,0), c(0,1), c(1,2) and b(2) must be closed in order to form a group with sections 10, 11, 0, 1, and 2 connected in series as shown in FIG. 3 with those switches that must be closed encircled.

The advantages provided by the embodiment described above is that;

1. substantially uniform discharge of each section is substantially guaranteed,
2. there is no loss in power due to hysteresis and Foucaut currents, such as exhibited in the pulse modulation or impulse method of the prior art, and
3. there is no loss due to resistors, such as exhibited in the method using resistor ladder networks of the prior art.

The embodiment described above is only capable of providing multiple discrete voltage steps. FIG. 4A illustrates a second embodiment of the present invention that is able to provide a continuous range of desired voltages between two voltage steps. In addition to the components comprising the first embodiment illustrated in FIGS. 1 and 2, the second embodiment of FIG. 4A comprises a secondary positive bus 54, a switching diode 56, a power or modulating switch 58, a plurality of secondary negative switches d(1) to d(3) or d(k) and a plurality of secondary positive switches e(1) to e(3) or e(k).

As in the first embodiment described above each section is assigned a corresponding primary positive switch a(i), a corresponding primary negative switch b(j), a corresponding series switch c(i,j), a corresponding secondary negative switch d(k) and a corresponding secondary positive switch e(k). The secondary positive switches e(k) can connect the positive terminals of each section to the secondary positive bus 54. The secondary negative switches d(k) can connect the negative terminals of each section to the primary positive bus 20. Both the secondary negative switches d(k) and the secondary positive switch es e(k) can be controlled by the control device 30.

The combination of the modulating switch 58 and the power diode 56 connect either the primary positive bus 20 or the secondary positive bus 58 to the load 24 under the control of the control device 30. By varying the duration of the time that either positive buses (20 or 58) are connected to the load 24, any desired voltage V can be obtained between two voltage steps.

Figure 4B:
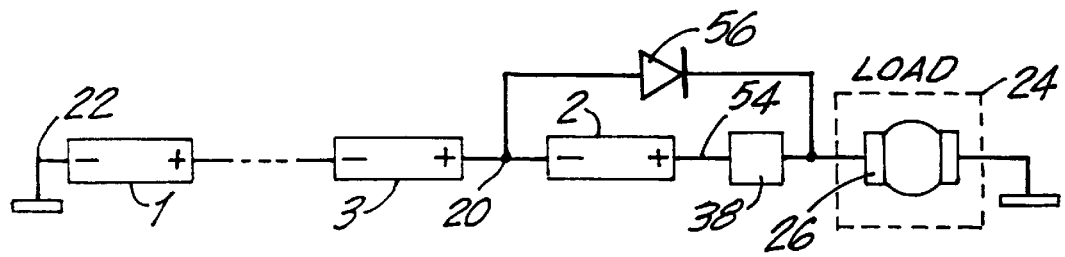
FIG. 4B illustrates an equivalent circuit of the second embodiment of the DC current generator and load of FIG. 4A.
Figure 4A:
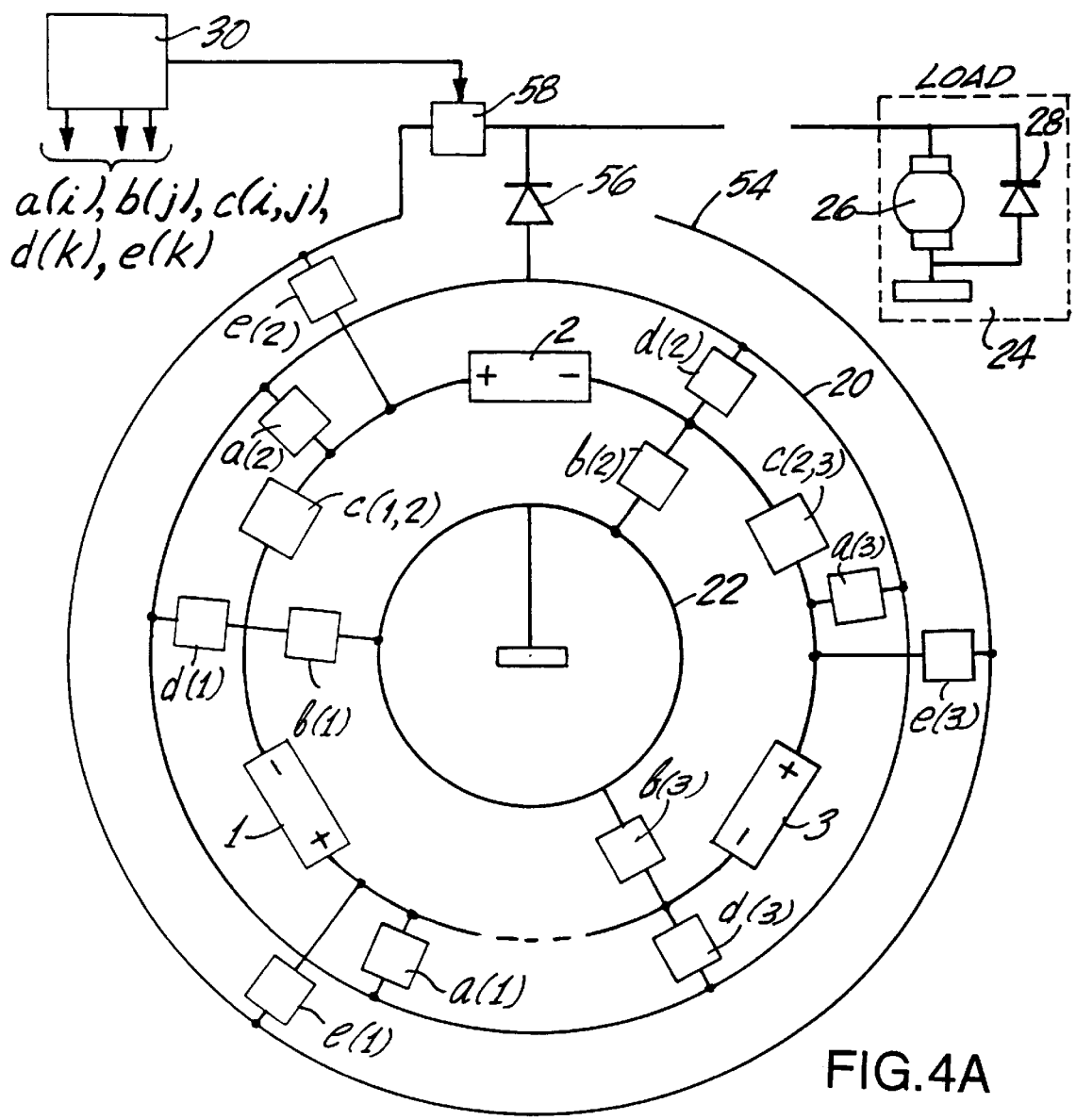
FIG. 4A illustrates a second embodiment of the DC current generator and load of FIG. 1.

FIG. 4B is an equivalent circuit of the second embodiment of FIG. 4A, which shows that a predetermined number of section, in this case 1 . . . 3, are connected in series with each other and the series connection is connected in parallel across the negative bus 22 and the primary positive bus 20.

The series connection of sections 1. . . 3 provides a first voltage step. Additional sections, in this case 2, are connected in parallel across the primary positive bus 20 and the secondary positive bus 54. All or part of the unassigned sections form a unique additional group which provides a second voltage step equal to the voltage of one section. When the modulating switch 58 is closed, the load 24 experiences the voltage of the secondary positive bus 54, which is a combination of the first and second voltage steps. When the modulating switch 58 is open, the load 24 only experiences the voltage of the primary positive bus 20 via the power diode 56. Equivalent means well known in the art may be substituted for the modulating switch 58 and the power diode 56 such as complementary transistor pairs or two switches that alternate states in opposition to each other (e.g., one is on when the other is off).

For example, referring to FIG. 4A, assuming that the first voltage step is formed with section 2 and the second voltage step is formed with section 3, switches a(2), b(2), d(3) and e(3) must be closed. When the modulating switch 58 is open the voltage from the primary positive bus 20 is applied to the load 24 through the power diode 56. When the modulating switch 58 is closed the voltage from the secondary positive bus 58 is applied to the load 24, and the power diode presents an open circuit between the primary positive bus 20 and the load 24.

By linearly changing the value of the modulation coefficient or frequency of switching the modulation switch 58, the desired voltage V seen by the load 24 represents a linear average of the first and second voltage steps. Such a technique is an improvement over the pulse width modulation method of the prior art since the prior art modulates between the first voltage step and ground as opposed to the second voltage step, which is potentially nearer the first voltage step. The modulation of the present invention results in a reduction in power loss and potential damage to devices associated with the DC current generator.

Figure 5:
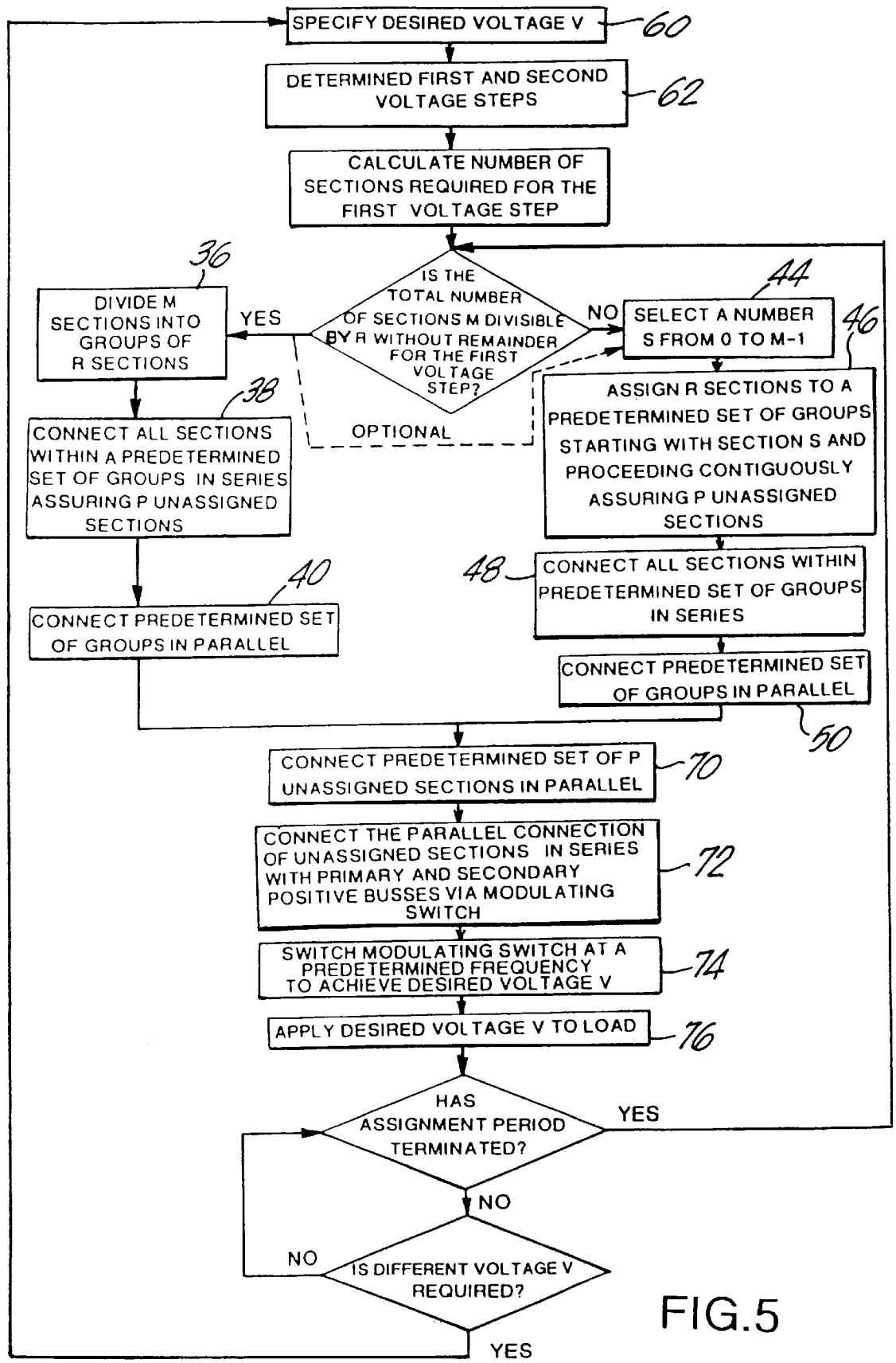
FIG. 5 is a flowchart illustrating the operation of the second embodiment of the DC current generator of FIG. 4A.

FIG. 5 illustrates a method used in conjunction with the second embodiment, shown in FIGS. 4A and 4B, to deliver continuous variations of the desired voltage V between voltage steps. The desired voltage V is specified in step 60 and the first and second voltage steps, which bracket the desired voltage V, are determined in step 62. Substantially the same steps 36, 38, 40, 44, 46, 48 and 50 as were performed in FIG. 2 with respect to the first embodiment are performed in the second embodiment. One method of assuring that P sections will remain unassigned to a group, is calculated according to the following equation:

$$G = \text{int}\left(\frac{M}{R}\right) \text{ for } G*R < M, \text{ and}$$

$$G = \text{int}\left(\frac{M}{R}\right) - 1 \text{ for } G*R = M.$$

If P is the quantity of sections that form the additional group, then P must be less than R and, therefore, $$(R-G)+P=M.$$

If all of the unassigned sections P are to be used in creating the second voltage step (i.e., connected in parallel as an additional group), then $$P=(M-R)G$$

and if $$G \cdot R = M$$

then, to allow for the additional unassigned sections, the quantity of groups G must be reduced by one. Assigning all sections to groups and connecting those sections in series within the assigned groups is not strictly required since a predetermined number of sections must remain unassigned in order to create the second voltage step. However, not assigning sections will have an impact on the uniformity of discharge between the sections and is to be carefully monitored in order to achieve the goals of the invention.

Upon completing the parallel connection of the groups, which provides the first voltage step, a predetermined set of the unassigned sections are connected in parallel in step 70. The parallel connection of these sections forms an additional group which is connected in parallel with the primary and secondary positive busses in step 72. This is accomplished by connecting the negativemost terminal of each unassigned section to the primary positive bus and the positivemost terminal of each unassigned section to the secondary positive bus that provides the second voltage step.

In step 74 and 76, the modulating switch is switched at a predetermined frequency to provide a continuous range of voltages to the load between the voltages of the primary and secondary positive busses. Following the optional assignment period a different value for the number S is chosen and the steps from step 44 are reiterated as shown in FIG. 5. If the assignment period has not terminated or the assignment period has not been implemented then the method determines whether a different voltage is required and if so returns to step 60 to reiterate the entire process. If a different voltage V is not required the same voltage V continues to be applied.

The assignment of sections to groups and additional sections for M equal to twelve is provided in the following Table 3:

TABLE 3

| TOTAL NUMBER OF GROUPS | SECTIONS PER GROUP (R) | DESIRED VOLTAGE (V) | AMOUNT OF UNASSIGNED SECTIONS TO BE CONNECTED IN PARALLEL |
|---|---|---|---|
| 11 | 1 | 1U | 1 |
| 5 | 2 | 2U | 2 |
| 3 | 3 | 3U | 3 |
| 2 | 4 | 4U | 4 |
| 2 | 5 | 5U | 2 |
| 1 | 6 | 6U | 6 |
| 1 | 7 | 7U | 5 |
| 1 | 8 | 8U | 4 |
| 1 | 9 | 9U | 3 |
| 1 | 10 | 10U | 2 |
| 1 | 11 | 11U | 1 |
| 1 | 12 | 12U | 0 |

The following tables represent group assignments given M equal to four. The first voltage step results in four variations and is provided in the following Table 4:

TABLE 4

| NUMBER OF SECTIONS IN GROUPS | NUMBER OF SECTIONS IN ADDITIONAL GROUP |
|---|---|
| 0,1,2 (in parallel for 3 groups) | 3 |
| 1,2,3 (in parallel for 3 groups | 0 |
| 2,3,0 (in parallel for 3 groups | 1 |
| 3,0,1 (in parallel for 3 groups) | 2 |

The second voltage step results in four variations and is provided in the following Table 5:

TABLE 5

| NUMBER OF SECTIONS IN GROUPS | NUMBER OF SECTIONS IN ADDITIONAL GROUP |
|---|---|
| 0,1 (in series for 1 group) | 2,3 |
| 1,2 (in series for 1 group) | 3,0 |
| 2,3 (in series for 1 group) | 0,1 |
| 3,0 (in series for 1 group) | 1,2 |

The third voltage step results in four variations and is provided in the following Table 6:

TABLE 6

| NUMBER OF SECTIONS IN GROUPS | NUMBER OF SECTIONS IN ADDITIONAL GROUP |
| --- | --- |
| 0,1,2 (in series for 1 group) | 3 |
| 1,2,3 (in series for 1 group) | 0 |
| 2,3,0 (in series for 1 group) | 1 |
| 3,0,1 (in series for 1 group) | 2 |

The fourth voltage step is formed by connecting all sections in series without any additional section remaining unconnected.

In each of the embodiments described above any number of sections can be used, each surrounded by the corresponding switches and generator in accordance with the particular embodiment. Although a ring is illustrated as the means for connecting the various sections and switches, this is intended for illustrative purposes alone and not as a limitation, when in fact the means for connection may comprise any equivalent means or shape well known in the art. In each of the embodiments of the present invention uniform discharge of sections over time is substantially ensured, which results in, for instance, the uniform heating of sections and overall increased reliability of the components used in association with the DC current generator as well as the load.

The identity of the remaining switches to form the remaining groups in the embodiments described above can be determined from the same equation used to determine the identity of the first group by substituting the random number S with $(S+R)(\mod M)$ for the second group, $(S+2R)(\mod M)$ for the third group, and $(S+(K-1)R)(\mod M)$ for the K-th group.

For instance for $M=12$, $R=5$ and $r=10$, in order to form the second group S should be substituted with $(S=R)(\mod M)=15(\mod 12)=3$ and the equation to determine switch closures for the second group is as follows:

$$a(3) \& ( \&_{i=0}^{3} c((3 + i)(\mod 12),$$
$$(4 + i)(\mod 12))) \& b((7)(\mod 12)).$$

Solving this equation indicates that switch es $a(3)$, $c(3,4)$, $c(5,6)$, $c(6,7)$ and $b(7)$ should be closed in order to form the second group.

If G represents the number of groups to be connected in parallel ($G=\mathrm{int}(M/R)$ for the first embodiment and $G=\mathrm{int}(M/R)$ for $G*R<M$ and $G=\mathrm{int}(M/R)-1$ for the second embodiment) then for each K-th group ($K=1, 2, \ldots, G$) the Law of Commutation is as follows:

for $R=1$ and $K=1, 2, \ldots, G$, $$a((S+(K-1)R)(\mod M)) \& b((S+(K-1)R)(\mod M))$$

for $R>1$ and $K=1, 2, \ldots, G$, $$a((S + (K - 1)R)(\mod M)) \& ( \&_{i=0}^{R-2} c((S + (K - 1)R + i)(\mod M),$$
$$(S + (K - 1)R + i + 1)(\mod M))) \& b((S + KR - 1)(\mod M))$$

For the second embodiment, the identity of the remaining switches required to connect the remaining sections in parallel is defined by the following expression:

$$\&_{i=0}^{P-1} (d((S + GR + i)(\mod M)) \& e((S + GR + i)(\mod M)))$$

Where G represents the number of groups and P represents the number of unassigned sections to be connected in parallel.

If a power source consists of M sections, then M different non-zero voltage steps can be achieved. Let $i=1, 2, 3, \ldots, M$ be the number of the voltage step. The probability for any step i to be chosen is equal to $$p_i = \frac{M - M(\mod i)}{M}$$

and the probability for it not to be chosen is equal to $$q_i = \frac{M(\mod i)}{M}$$

Since $$p+q=1$$

we have the classic Bernoulli scheme and, therefore, the probability for any section to be chosen j times during k realizations of the $i^{th}$ voltage step is equal to $$C_k^j p_i^j q_i^{k-j}.$$

The average number of selections of the same sections is equal to $$kp$$

and the variance of the number of selections of the same section is equal to $$kpq.$$

Let $f_i$ be the probability that the $i^{th}$ voltage step is used. In other words, $f_i$ represents the relative frequency of usage of the $i^{th}$ voltage step while the load is operating or $$\sum_{i=1}^{n} f_i = 1.$$

This means that with N changes of the voltage step over time, the average number of realizations of the $i^{th}$ voltage step is equal to $$K_i = f_i N_i$$

and for each section the average number of time each section will be chosen to form the $i^{th}$ voltage step is equal to $$\xi = f_i N \frac{M - M(\mod i)}{M}$$

and the variance of this number is equal to $$\delta_i^2 = f_i N \frac{M - M(\bmod i)}{M} \frac{M(\bmod i)}{M}.$$

For N voltage step changes the average number of selections of the same section is equal to $$\xi = \frac{N}{M} \sum_{i=1}^{M} f_i(M - M(\bmod i))$$

and the standard deviation of the number is equal to $$\delta = \frac{\sqrt{N}}{M} \sqrt{\sum_{i=1}^{M} f_i(M - M(\bmod i))M(\bmod i)}.$$

The coefficient of non-uniformity for usage for any section is defined as the coefficient of variance represented by the following equation:

$$\wp = \frac{\delta}{\xi} = \frac{1}{\sqrt{N}} \frac{\sqrt{\sum_{i=1}^{M} f_i(M - M(\bmod i))M(\bmod i)}}{\sum_{i=1}^{M} f_i(M - M(\bmod i))}$$

Consider a particular case in which all relative frequencies are equal and the vehicle must frequently stop and go in heavy traffic. The resulting non-uniformity coefficient is as follows:

$$\wp = \frac{1}{\sqrt{NM}} \frac{\sqrt{\sum_{i=1}^{M} f_i(M - M(\bmod i))M(\bmod i)}}{\sum_{i=1}^{M} (M - M(\bmod i))} = \frac{\wp_o}{\sqrt{N}}$$

Where $\wp_o$ defines the non-uniformity coefficient for one cycle of the voltage step as it changes from i=1 to i=M, corresponding to one acceleration from a stopped state to the full speed state of the vehicle. In the following table 7, the non-uniformity coefficients are presented for different power sources comprising M=1 to M=61 sections.

TABLE 8

| NUMBER OF SECTIONS | NON-UNIFORMITY COEFFICIENT | NUMBER OF SECTIONS | NON-UNIFORMITY COEFFICIENT |
|---|---|---|---|
| 2 | 0.0000 | 32 | 0.0126 |
| 3 | 0.10271 | 33 | 0.0124 |
| 4 | 0.0577 | 34 | 0.0124 |
| 5 | 0.0797 | 35 | 0.0108 |
| 6 | 0.0446 | 36 | 0.0113 |
| 7 | 0.0583 | 37 | 0.0112 |
| 8 | 0.0428 | 38 | 0.0111 |
| 9 | 0.0421 | 39 | 0.0101 |
| 10 | 0.0354 | 40 | 0.0105 |
| 11 | 0.0399 | 41 | 0.0096 |
| 12 | 0.0274 | 42 | 0.0100 |
| 13 | 0.0317 | 43 | 0.0095 |
| 14 | 0.0287 | 44 | 0.0092 |
| 15 | 0.0266 | 45 | 0.0091 |
| 16 | 0.0231 | 46 | 0.0094 |
| 17 | 0.0253 | 47 | 0.0085 |
| 18 | 0.0210 | 48 | 0.0086 |
| 19 | 0.0228 | 49 | 0.0083 |
| 20 | 0.0195 | 50 | 0.0083 |
| 21 | 0.0190 | 51 | 0.0080 |
| 22 | 0.0183 | 52 | 0.0082 |
| 23 | 0.0194 | 53 | 0.0077 |
| 24 | 0.0158 | 54 | 0.0078 |
| 25 | 0.0163 | 55 | 0.0074 |
| 26 | 0.0159 | 56 | 0.0074 |
| 27 | 0.0156 | 57 | 0.0073 |
| 28 | 0.0143 | 58 | 0.0075 |
| 29 | 0.0150 | 59 | 0.0068 |
| 30 | 0.0130 | 60 | 0.0070 |
| 31 | 0.0137 | 61 | 0.0069 |

Table 8 shows that as the number of sections increases the non-uniformity coefficient decreases rapidly. This is true even during the first acceleration of the vehicle. As the number of voltage steps increases N increases and the non-uniformity coefficient decreases according to $$\frac{1}{\sqrt{N}}$$

Therefore, given the example discussed above, the non-uniformity coefficient will be equal to $$\frac{0.0446}{\sqrt{4}} = 0.0223$$

after four accelerations. Thus, by using the method of the present invention the uniformity of discharge for each section, given any number of sections, is substantially ensured following the first acceleration of the vehicle.

The following variations to the embodiments described above remain within the scope of the present invention:
1. Inverting the polarity of the busses to create a negative potential to the load, and
2. Changing the ring-like shape of the busses and arrangement of sections.

Although the invention has been shown and described with respect to best mode embodiments thereof, it should be understood by those skilled in the art that the foregoing and various other changes, omissions and additions in the form and detail thereof may be made therein without departing from the spirit and scope of the present invention.

What is claimed is:

1. A method for providing a voltage V which comprises:
   calculating a number R of energy elements required to provide a desired voltage V;
   assigning each of a total number of energy elements M a number from zero to M−1;
   selecting a number S from zero to M−1;
   connecting energy elements in a set of groups of R energy elements in series starting with said first energy element assigned said number S; and
   connecting in parallel said set of groups of said R energy elements, said parallel connection of groups providing a voltage substantially equivalent to said desired voltage V;

further comprising the step of
reiterating said steps of selecting said number S, connecting said energy elements in a set of groups of R energy elements in series, and connecting in parallel said set of groups of said R energy elements following termination of a predetermined assignment period.

2. The method for providing a voltage V of claim 1, further comprising the step of connecting said energy elements in accordance with the following equations for R=1 and K=1, 2, . . . , G, $$a((S+(K-1)R)(\mod M)) \& b((S+(K-1)R)(\mod M))$$

for R>1 and K=1, 2, . . . , G, $$a((S+(K-1)R)(\mod M)) \& (\&_{i=0}^{R-2} c((S+(K-1)R+i)(\mod M),$$
$$(S+(K-1)R+i+1)(\mod M))) \& b((S+KR-1)(\mod M))$$

where G is the total number of groups to be connected in parallel, K is an indexing variable through the number of groups G, R is the number of energy elements required to achieve said desired voltage V, S is a random number, M is the total number of energy elements, i is an indexing variable, a–c are Boolean variables representing states of switches connecting the energy elements, & is the logical "and" function, and mod represents the value of the remainder following division.

3. A method for providing a voltage V which comprises:
calculating a number R of energy elements required to provide a desired voltage V;
assigning each of a total number of energy elements M a number from zero to M−1;
selecting a number S from zero to M−1;
connecting energy elements in a set of groups of R energy elements in series starting with said first energy element assigned said number S; and
connecting in parallel said set of groups of said R energy elements, said parallel connection of groups providing a voltage substantially equivalent to said desired voltage V;
wherein said number S is substantially randomly selected.

4. A method for providing a voltage V which comprises:
calculating a number R of energy elements required to provide a desired voltage V;
assigning each of a total number of energy elements M a number from zero to M−1;
selecting a number S from zero to M−1;
connecting energy elements in a set of groups of R energy elements in series starting with said first energy element assigned said number S; and
connecting in parallel said set of groups of said R energy elements, said parallel connection of groups providing a voltage substantially equivalent to said desired voltage V;
wherein said number S is selected by incrementing a prior value of said number S by a predetermined amount.

5. A method for providing a voltage V which comprises:
calculating a number R of energy elements required to provide a primary voltage V0 which is equal or less to a desired voltage V such that the difference between the desired voltage V and the primary voltage V0 is less than the voltage of one energy element ;
assigning each of a total number of energy elements M a number from zero to M−1;
selecting a number S from zero to M−1;
connecting energy elements in a set of groups of R energy elements in series starting with said first energy element assigned said number S; and
connecting in parallel said set of groups of said R energy elements, said parallel connection of groups providing a voltage substantially equivalent to said primary voltage V0;
further comprising the steps of
connecting in parallel an additional set of said energy elements not already connected in said groups;
connecting a negativevemost terminal of said additional set of energy elements to a positivemost terminal that provides a primary voltage V0; and
alternating at a predetermined rate between a positivemost terminal of said additional set and a positivemost terminal of primary voltage V0, thereby providing an intermediate voltage equal to a desired voltage V.

6. The method for providing a voltage V of claim 5, further comprising the step of connecting said additional set of energy elements in accordance with the following equation $$\&_{i=0}^{P-1}(d((S+GR+i)(\mod M)) \& e((S+GR+i)(\mod M)))$$

where G is the total number of groups to be connected in parallel, P is the number of unassigned energy elements to be connected in parallel, R is the number of energy elements required to achieve said primary voltage V0, S is a random number, M is the total number of energy elements, i is an indexing variable, d–e are Boolean variables representing states of switches connecting the energy elements, & is the logical "and" function, and mod represents the value of the remainder following division.

7. A method for providing a voltage V which comprises:
calculating a number R of energy elements required to provide a primary voltage V0 which is equal or less than a desired voltage V such that the difference between the desired voltage V and the primary voltage V0 is less than the voltage of one energy element;
calculating a number G of groups of R energy elements in series so that not all the energy elements of a total number M would be used in said groups;
assigning each of said total number of energy elements M a number from zero to M−1;
selecting a number S from zero to M−1;
connecting energy elements in a set of groups of R energy elements in series starting with said first energy element assigned to said number S; and
connecting in parallel said set of groups of said energy elements, said parallel connection of groups providing a voltage substantially equivalent to said primary voltage V0;
further comprising the steps of:
connecting in parallel an additional set of said energy elements not already connected in said groups;
connecting a negativemost terminal of said additional set of energy elements to a positivemost terminal that provides a primary voltage V0; and
alternating at-a-predetermined rate between a positivemost terminal of said additional set and a positivemost terminal of primary voltage V0, thereby providing an intermediate voltage equal to a desired voltage V.

8. The method for providing a voltage V of claim 7, further comprising connecting said energy elements in accordance with the following equations for R=1, $$a(S) \& b(S)$$

and for R>1, $$a(S) \& ( \&_{i=0}^{R-2} c((S+i)(\bmod M),$$
$$(S+i+1)(\bmod M))) \& b((S+R-1)(\bmod M))$$

where R is the number of energy elements required to achieve said desired voltage V, S is a random number, M is the total number of energy elements, i is an indexing variable, a–c are Boolean variables representing states of switches connecting the energy elements, & is the logical "and" function, and mod represents the value of the remainder following division.

9. The method for providing a voltage V of claim 7, further comprising the step of reiterating said steps of selecting said number S, connecting said energy elements in a set of G groups of R energy elements in series, connecting in parallel said set of G groups of said R energy elements, connecting in parallel an additional set of said energy elements not already connected in said group, connecting a negativemost terminal of said additional set of energy elements to a positivemost terminal that provides a primary voltage V0, and alternating at a predetermined rate between a positivemost terminal of said additional set and a positivemost terminal of primary voltage V0, thereby providing an intermediate voltage equal to a desired voltage V following termination of a predetermined assignment period.

10. The method for providing a voltage V of claim 9, further comprising the step of connecting said energy elements in accordance with the following equations
for R=1 and K=1, 2, ..., G, $$a((S+(K-1)R)(\bmod M)) \& b((S+(K-1)R)(\bmod M))$$

for R>1 and K=1, 2, ..., G, $$a((S+(K-1)R)(\bmod M) \& ( \&_{i=0}^{R-2} c((S+(K-1)R+i)(\bmod M),$$
$$(S+(K-1)R+i+1)(\bmod M))) \& b((S+KR-1)(\bmod M))$$

where G is the total number of groups to be connected in parallel, K is an indexing variable through the number of groups G, R is the number of energy elements required to achieve said primary voltage V0, S is a random number, M is the total number of energy elements, i is an indexing variable, a–c are Boolean variables representing states of switches connecting the energy elements, & is the logical "and" function, and mod represents the value of the remainder following division.

11. The method for providing a voltage V of claim 7, wherein said number S is substantially randomly selected.

12. The method for providing a voltage V of claim 7, wherein said number S is selected by incrementing a prior value of said number S by a predetermined amount.

13. The method for providing a voltage V of claim 7, wherein when said number G of said groups of R energy elements in series is equal to zero a primary voltage V0 is equal to zero and a desired voltage V is obtained by alternating at a predetermined rate between a positivemost terminal of said additional set and a negativemost terminal of primary voltage V0.

14. A method for providing a voltage V which comprises:
calculating a number R of energy elements required to provide a desired voltage V;
connecting energy elements in a first set of groups of R energy elements in series starting from a first energy element if a total number of energy elements M is divisible by R with a remainder equal to zero; and
connecting in parallel said first set of groups of said R energy elements, said parallel connection of groups providing a voltage substantially equivalent to said desired voltage V;
further comprising the steps of
connecting an additional set of said energy elements not already connected in parallel;
connecting a negativevemost terminal of said additional set to said desired voltage V; and
alternating at a predetermined rate between a positivemost terminal of said additional set and said desired voltage, thereby providing an intermediate voltage between and inclusive of said positivemost terminal and said desired voltage V.

15. The method for providing a voltage V of claim 14, further comprising the step of connecting said additional set of energy elements in accordance with the following equation $$\&_{i=0}^{P-1}(d((S+GR+i)(\bmod M) \& e((S+GR+i)(\bmod M)))$$

where G is the total number of groups to be connected in parallel, P is the number of unassigned energy elements to be connected in parallel, R is the number of energy elements required to achieve said desired voltage V, S is a random number, M is the total number of energy elements, i is an indexing variable, d–e are Boolean variables representing states of switches connecting the energy elements, & is the logical "and" function, and mod represents the value of the remainder following division.

16. An apparatus for providing a voltage V which comprises:
means for conducting primary voltage;
means for conducting return voltage;
means for providing discrete voltages connectable in series with each other, said means for providing discrete voltages connectable to said means for conducting primary voltage and said means for conducting return voltage; and
means for control adapted to control said connectability of said means for providing discrete voltages, said means for control connecting a set of groups comprising R means for providing discrete values in series starting with a first energy element of said means for providing discrete voltages, said control device connecting said set of groups in parallel to provide a desired voltage in parallel across said means for conducting primary voltage and said means for conducting return voltage; wherein said first energy element is rechosen following an assignment period.

17. An apparatus for providing a voltage V which comprises:
means for conducting primary voltage;
means for conducting return voltage;
means for providing discrete voltages connectable in series with each other, said means for providing discrete voltages connectable to said means for conducting primary voltage and said means for conducting return voltage; and means for control adapted to control said connectability of said means for providing discrete voltages, said means for control connecting a set of groups comprising R means for providing discrete values in series starting with a first energy element of said means for providing discrete voltages, said control device connecting said set of groups in parallel to provide a desired voltage in parallel across said means for conducting primary voltage and said means for conducting return voltage; wherein said first energy element is chosen substantially at random.

18. An apparatus for providing a voltage V which comprises:

means for conducting primary voltage;

means for conducting return voltage;

means for providing discrete voltages connectable in series with each other, said means for providing discrete voltages connectable to said means for conducting primary voltage and said means for conducting return voltage; and means for control adapted to control said connectability of said means for providing discrete voltages, said means for control connecting a set of groups comprising R means for providing discrete values in series starting with a first energy element of said means for providing discrete voltages, said control device connecting said set of groups in parallel to provide a desired voltage in parallel across said means for conducting primary voltage and said means for conducting return voltage; wherein said first energy element is chosen by incrementing through subsequent energy elements using a predetermined value.

19. An apparatus for providing a voltage V which comprises:

means for conducting primary voltage;

means for conducting return voltage;

means for providing discrete voltages connectable in series with each other, said means for providing discrete voltages connectable to said means for conducting primary voltage and said means for conducting return voltage; and means for control adapted to control said connectability of said means for providing discrete voltages, said means for control connecting a set of groups comprising R means for providing discrete values in series starting with a first energy element of said means for providing discrete voltages, said control device connecting said set of groups in parallel to provide a desired voltage in parallel across said means for conducting primary voltage and said means for conducting return voltage; further comprising means for conducting secondary voltage connectible to said means for providing discrete voltages means for switching between said means for conducting secondary voltage and said means for conducting primary voltage, said means for switching controllable by said control device, said means for switching alternatively providing said secondary voltage and said primary voltage at a predetermined rate, thereby providing a predetermined voltage between and inclusive of said primary voltage and said secondary voltage.

20. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R−1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primary positive voltage substantially equivalent to a desired voltage V on said primary positive bus; wherein said control device is adapted to connect via said switches said energy elements not in said first group in series with subsequent energy elements to form groups of R, energy elements connected in series until an insufficient number of energy elements remain to form another of said groups of R energy elements;

wherein said control device is adapted to connect via said switches said energy elements in accordance with the following equations for R=1 and K=1, 2, . . . , G, $$a((S+(K-1)R)(\mod M)) \& b((S+(K-1)R)(\mod M))$$

for R>1 and K=1, 2, . . . , G, $$a((S+(K-1)R)(\mod M)) \& (\&_{i=0}^{R-2} c((S+(K-1)R+i)(\mod M),$$
$$(S+(K-1)R+i+1)(\mod M))) \& b((S+KR-1)(\mod M))$$

where G is the total number of groups to be connected in parallel, K is an indexing variable through the number of groups G, R is the number of energy elements required to achieve said desired voltage V, S is a random number, M is the total number of energy elements, i is an indexing variable, a–c are Boolean variables representing states of switches connecting the energy elements, & is the logical "and" function, and mod represents the value of the remainder following division.

21. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R-1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primary positive voltage substantially equivalent to a desired voltage V on said primary positive bus;

wherein said control device starts with a different first energy element following termination of an assignment period.

22. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R-1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primary positive voltage substantially equivalent to a desired voltage V on said primary positive bus;

wherein said first energy element is chosen substantially at random.

23. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R-1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primary positive voltage substantially equivalent to a desired voltage V on said prima ry positive bus;

wherein said first energy element is chosen by incrementing through said subsequent energy elements using a predetermined value.

24. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R-1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primary positive voltage substantially equivalent to a desired voltage V on said primary positive bus;

wherein said primary positive bus, said negative bus and said energy elements are arranged such that they are substantially equidistant from a central point said primary positive bus, said negative bus and said energy elements comprising substantially concentric rings about said central point.

25. An apparatus for providing DC voltage from discrete energy elements which comprises:

a primary positive bus comprising a primary positive voltage;

a negative bus;

a plurality of energy elements each comprising a positive terminal and a negative terminal, said positive terminal of each of said energy elements electrically connectable to said negative terminal of a subsequent energy element via one of a plurality of series switches, said negative terminal of each of said energy elements electrically connectable to said negative bus via one of a plurality of primary negative switches, said positive terminal of each of said energy elements electrically connectable to said primary positive bus via one of a plurality of primary positive switches; and a control device adapted to control said series, primary positive and primary negative switches, said control device adapted to connect a first energy element in series with R−1 subsequent energy elements to form a first group of R energy elements via said series switches starting with said first energy element, said control device adapted to connect via said series switches said energy elements not in said first group in series with subsequent energy elements to form groups of R energy elements connected in series, said control device adapted to connect via said primary positive and primary negative switches said groups in parallel in order to provide said primarily positive voltage substantially equivalent to a desired voltage V on said primary positive bus;

further comprising a secondary positive bus electrically connectable to said positive terminal of said energy elements via one of a plurality of secondary positive switches; said negative terminal of said energy elements electrically connectable to said primary positive bus via one of a plurality of secondary negative switches, said secondary positive switches and said secondary negative switches controllable by said control device, said secondary positive bus comprising a secondary positive voltage;

a switching unit controllable by said control device, said switching unit alternately switching between providing said secondary positive voltage and said primary positive voltage, thereby providing a predetermined voltage between and inclusive of said primary positive voltage and said secondary positive voltage.

26. The apparatus for providing DC voltage from discrete energy elements of claim 25, wherein said control device is adapted to connect said additional set of energy elements in accordance with the following equation $$\&_{i=0}^{P-1} (d((S + GR + i)(\text{mod } M) \& e((S + GR + i)(\text{mod } M)))$$

where G is the total number of groups to be connected in parallel, P is the number of unassigned energy elements to be connected in parallel, R is the number of energy elements required to achieve said desired voltage V, S is a random number, M is the total number of energy elements, i is an indexing variable, d–e are Boolean variables representing states of switches connecting the energy elements, & is the logical "and" function, and mod represents the value of the remainder following division.

27. The apparatus for providing DC voltage from discrete energy elements of claim 25, wherein said secondary positive bus is arranged such that it is substantially equidistant from a central point, said secondary positive bus, comprising a substantially concentric ring about said central point.

28. The apparatus for providing DC voltage from discrete energy elements of claim 25, wherein said switching unit further comprises a modulation switch connected in series between said secondary positive bus and a load; and a diode connected in parallel across said primary positive bus and a load.

* * * * *

UNITED STATES PATENT AND TRADEMARK OFFICE
CERTIFICATE OF CORRECTION

PATENT NO. : 6,107,697
DATED : August 22, 2000
INVENTOR(S) : Markelov

It is certified that error appears in the above-identified patent and that said Letters Patent are hereby corrected as shown below:

In Claim 7, Line 51" said energy" should be written as "said R energy"

Signed and Sealed this

Twenty-fourth Day of April, 2001

*Attest:*

NICHOLAS P. GODICI

*Attesting Officer*     *Acting Director of the United States Patent and Trademark Office*